(12) United States Patent
Valeanu

(10) Patent No.: US 8,621,705 B1
(45) Date of Patent: Jan. 7, 2014

(54) SPRAYING WINDSHIELD WIPER ASSEMBLY

(76) Inventor: Nelu Valeanu, Maple Shade, NJ (US)

(*) Notice: Subject to any disclaimer, the term of this patent is extended or adjusted under 35 U.S.C. 154(b) by 173 days.

(21) Appl. No.: 13/223,982

(22) Filed: Sep. 1, 2011

(51) Int. Cl.
*B60S 1/52* (2006.01)

(52) U.S. Cl.
USPC .. 15/250.04; 239/284.1; 239/80; 15/250.351; 15/250.43; 15/250.001

(58) Field of Classification Search
USPC ............ 15/250.01, 250.02, 250.04, 250.43, 15/250.44, 250.47, 250.361, 250.32; 219/202; 239/284.1, 594, 595, 80, 589
See application file for complete search history.

(56) References Cited

U.S. PATENT DOCUMENTS

| | | | | |
|---|---|---|---|---|
| 3,876,284 A * | 4/1975 | Appleton | ................ | 359/520 |
| 3,916,473 A * | 11/1975 | Williams | ................ | 15/250.04 |
| 3,939,524 A * | 2/1976 | Knights | ................ | 15/250.04 |
| 3,969,783 A * | 7/1976 | Shipman | ................ | 15/250.04 |
| 4,133,071 A * | 1/1979 | Jaske | ................ | 15/250.04 |
| D257,339 S | 10/1980 | Ellinwood | | |
| 4,516,288 A | 5/1985 | Fizyta et al. | | |
| 4,959,882 A | 10/1990 | Henderson et al. | | |
| 5,724,699 A * | 3/1998 | Bexten | ................ | 15/250.04 |
| 5,944,910 A * | 8/1999 | Fujii | ................ | 134/6 |
| 6,094,772 A * | 8/2000 | West | ................ | 15/250.04 |
| 6,766,553 B2 * | 7/2004 | Wilson | ................ | 15/250.04 |
| 6,934,992 B2 * | 8/2005 | Sato | ................ | 15/250.04 |
| 7,127,158 B1 | 10/2006 | Yen et al. | | |
| 7,793,381 B2 | 9/2010 | Yon | | |
| 2005/0086758 A1 | 4/2005 | Arkashevski et al. | | |
| 2005/0229351 A1 * | 10/2005 | McMullen | ................ | 15/250.04 |
| 2008/0216274 A1 * | 9/2008 | Egner-Walter et al. | .... | 15/250.02 |
| 2009/0172907 A1 * | 7/2009 | Egner-Walter et al. | .... | 15/250.01 |

* cited by examiner

*Primary Examiner* — Mark Spisich
*Assistant Examiner* — Andrew A Horton

(57) ABSTRACT

A spraying windshield wiper assembly is provided for delivering cleaning fluid to a windshield surface from a wiper arm holding a wiper blade. The assembly includes a wiper arm having a first end and a second end. The first end is configured for coupling to a vehicle. An elongated blade housing is coupled to the second end of the wiper arm. A channel extends through the blade housing. A supply tube is coupled to the wiper arm and fluidly coupled to the channel for delivering a fluid to the channel. A plurality of nozzles is coupled to the wiper arm. Each nozzle is fluidly coupled to the channel whereby each nozzle is configured for dispensing the fluid from the channel onto the windshield of the vehicle. A wiper blade is coupled to the blade housing.

11 Claims, 2 Drawing Sheets

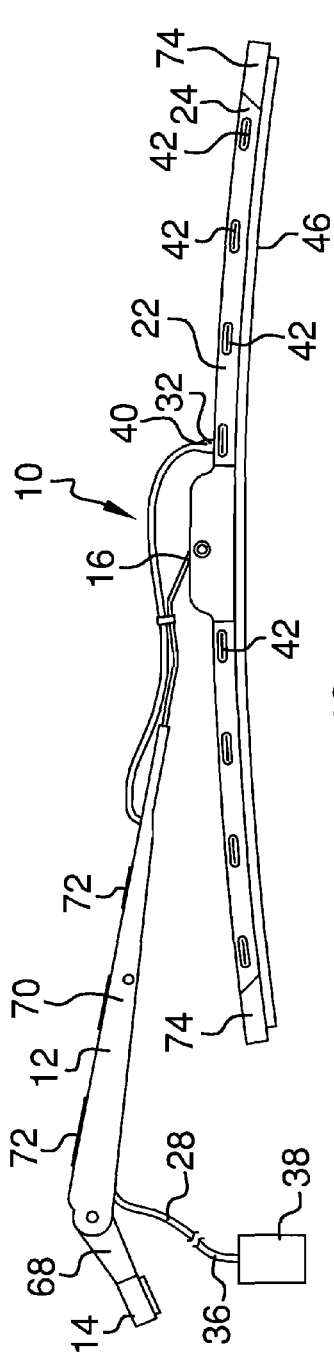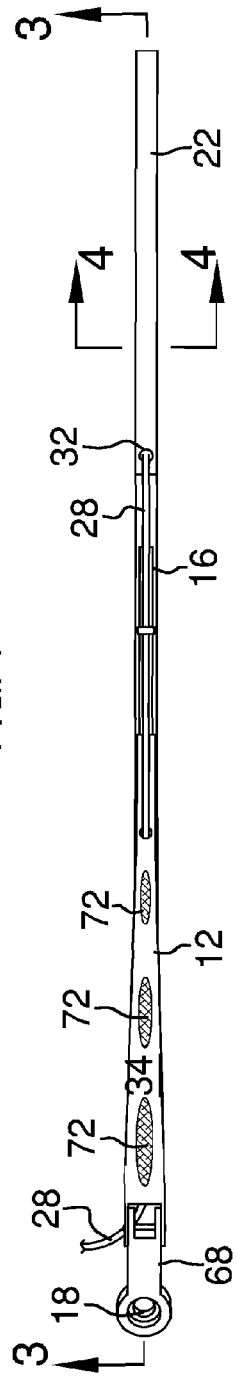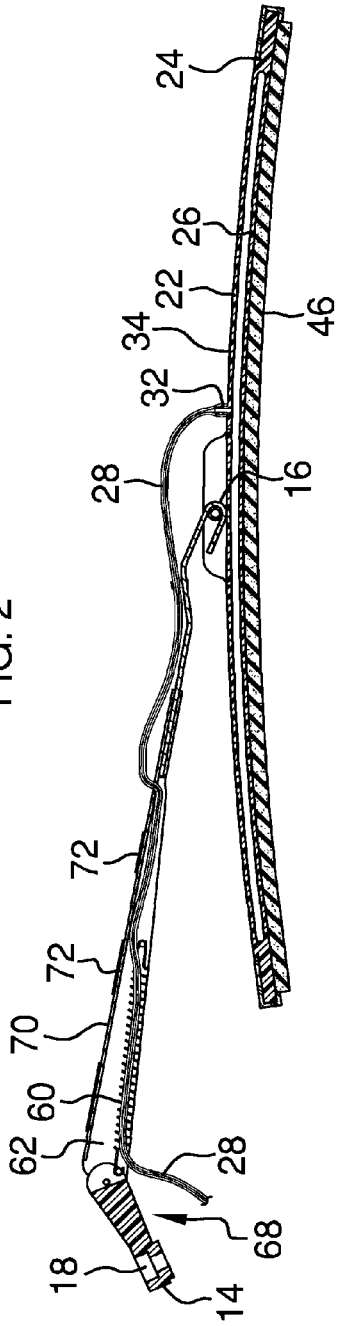

SPRAYING WINDSHIELD WIPER ASSEMBLY

BACKGROUND OF THE DISCLOSURE

Field of the Disclosure

The disclosure relates to windshield wiper devices and more particularly pertains to a new windshield wiper device for delivering cleaning fluid to a windshield surface from a wiper arm holding a wiper blade.

SUMMARY OF THE DISCLOSURE

An embodiment of the disclosure meets the needs presented above by generally comprising a wiper arm having a first end and a second end. The first end is configured for coupling to a vehicle. An elongated blade housing is coupled to the second end of the wiper arm. A channel extends through the blade housing. A supply tube is coupled to the wiper arm and fluidly coupled to the channel for delivering a fluid to the channel. A plurality of nozzles is coupled to the wiper arm. Each nozzle is fluidly coupled to the channel whereby each nozzle is configured for dispensing the fluid from the channel onto the windshield of the vehicle. A wiper blade is coupled to the blade housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a side view of a spraying windshield wiper assembly according to an embodiment of the disclosure.

FIG. 2 is a top view of an embodiment of the disclosure.

FIG. 3 is a cross-sectional view of an embodiment of the disclosure taken along line 3-3 of FIG. 2.

DESCRIPTION OF THE PREFERRED EMBODIMENT

Figure 4:
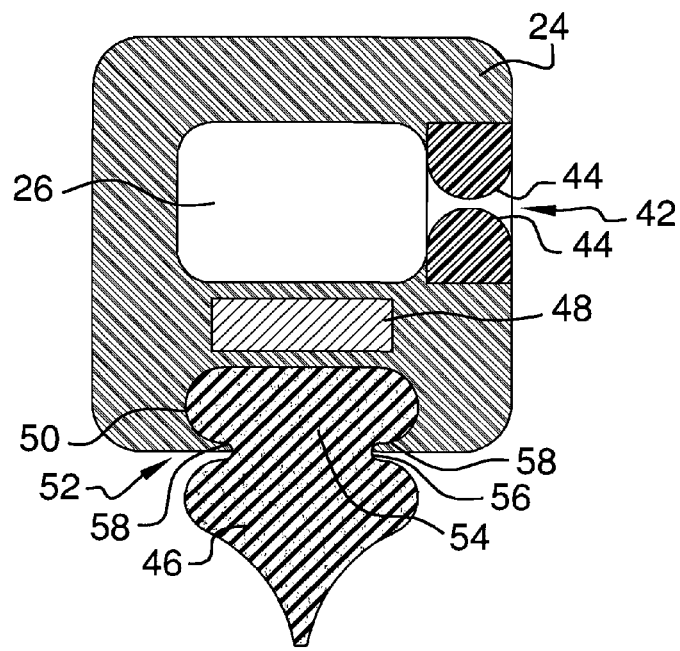
FIG. 4 is a cross-sectional view of an embodiment of the disclosure taken along line 4-4 of FIG. 2.

With reference now to the drawings, and in particular to FIGS. 1 through 5 thereof, a new windshield wiper device embodying the principles and concepts of an embodiment of the disclosure and generally designated by the reference numeral 10 will be described.

Figure 5:
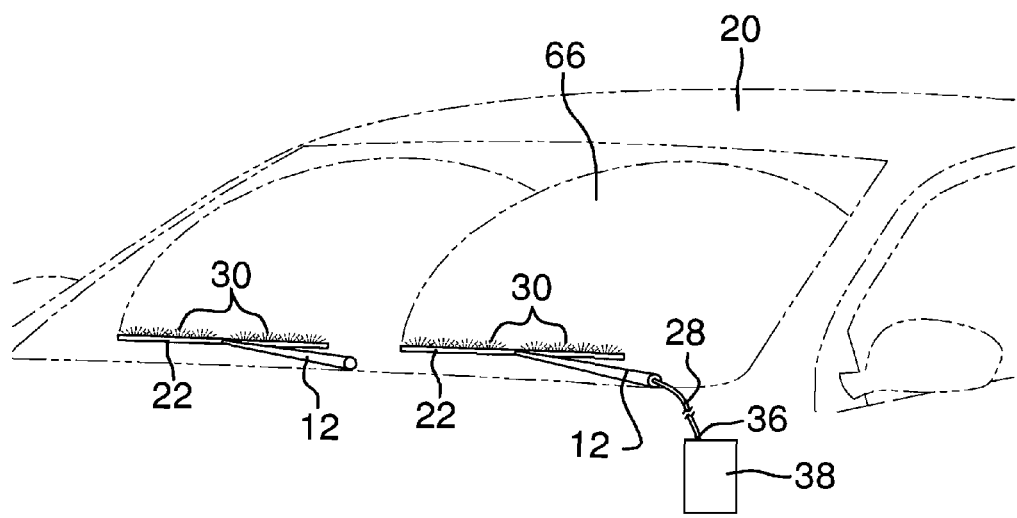
FIG. 5 is a top front side perspective view of an embodiment of the disclosure in use.

As best illustrated in FIGS. 1 through 5, the spraying windshield wiper assembly 10 generally comprises a wiper arm 12 having a first end 14 and a second end 16. The first end 14 may have a circular receiver 18 configured for coupling to a vehicle 20. The first end 14 is part of a connection portion 68 that is pivotally coupled to an elongated main body 70 of the wiper arm 12 that includes the second end 16. A spring 60 is coupled to the wiper arm 12 between the connection portion 68 and the main body 70 and positioned in an interior space 62 of the main body 70 of the wiper arm 12. The spring 60 is configured for urging the second end 16 of the wiper arm 12 towards a windshield 66 of the vehicle 20. An elongated blade housing 22 is coupled to the second end 16 of the wiper arm 12. The blade housing 22 is constructed of a resilient material 24 such as plastic or rubber. A channel 26 extends through the blade housing 22. The channel 26 may have a rectangular cross-sectional shape as shown in FIG. 5. A supply tube 28 is coupled to the wiper arm 12. The supply tube 28 may extend through the spring 60. The supply tube 28 is fluidly coupled to the channel 26 whereby the supply tube 28 is configured for delivering a fluid 30 to the channel 26.

An inlet port 32 is coupled to the blade housing 22. The inlet port 32 may be positioned on a top surface 34 of the blade housing 22 for facilitating access to the inlet port 32. The inlet port 32 is in fluid communication with the channel 26. A first end 36 of the supply tube 28 is configured for environmental communication with a fluid reservoir 38 of the vehicle 20. A second end 40 of the supply tube 28 is in environmental communication with the inlet port 32.

A plurality of nozzles 42 is coupled to the wiper arm 12. Each nozzle 42 is fluidly coupled to the channel 26 whereby each nozzle 42 is configured for dispensing the fluid 30 from the channel 26. Each nozzle 42 may have a pair of spaced arcuate surfaces 44.

A stiffening member 48 is coupled to the blade housing 22. The stiffening member 48 may be positioned in the blade housing 22 between the channel 26 and a wiper blade 46 coupled to the blade housing 22. A groove 50 extends into a bottom surface 52 of the blade housing 22. The wiper blade 46 has a tongue 54 extending from a narrow neck 56. The tongue 54 has a shape complementary to the groove 50 including spaced edges 58 that surround the neck 56 when the tongue 54 is positioned in the groove 50. Thus, the wiper blade 46 is coupled to the blade housing 22. End caps 74 may be coupled to the blade housing 22 to prevent disengagement of the wiper blade 46 from the blade housing 22.

Either a single reflector 72 or a plurality of reflectors 72 may be coupled to the wiper arm 12. The reflectors 72 may be positioned in spaced relationship along a length of the wiper arm 12.

In use, the wiper arm 12 is attached to the vehicle 20 and the blade housing 22 and wiper blade 46 are coupled to the wiper arm 12. The supply tube 28 is connected to deliver fluid 30 through the channel 26 and out through the nozzles 42 directly onto the windshield 66 of the vehicle 20 from a relatively short distance compared to conventional spray nozzles located at the base of a windshield adjacent a hood of a car.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A wiper blade assembly comprising:
   a wiper arm having a first end and a second end, said first end being configured for coupling to a vehicle;
   an elongated blade housing coupled to said second end of said wiper arm, said blade housing including a top surface, a bottom surface, a first lateral surface and a second lateral surface;
   a channel extending through said blade housing;
   a supply tube coupled to said wiper arm, said supply tube being fluidly coupled to said channel whereby said supply tube is configured for delivering a fluid to said channel;
   a plurality of nozzles coupled to said wiper arm, each nozzle being fluidly coupled to said channel whereby each said nozzle is configured for dispensing the fluid from said channel, each said nozzle having a pair of spaced arcuate surfaces, said arcuate surfaces being convexly arcuate and facing each other;
   a wiper blade coupled to said blade housing, said wiper blade extending outwardly from said bottom surface, said channel being positioned between said wiper blade and top surface, said wiper blade having a distal edge with respect to said blade housing, wherein a line oriented perpendicular to said top surface and extending through said distal edge will traverse said channel; and
   wherein said plurality of nozzles are each positioned nearer said top surface than said bottom surface.

2. The assembly of claim 1, further including a stiffening member coupled to said blade housing.

3. The assembly of claim 2, further including said stiffening member being positioned in said blade housing between said channel and said wiper blade, wherein said line will further traverse said stiffening member.

4. The assembly of claim 1, further comprising:
   a groove extending into said bottom surface of said blade housing; and
   a tongue of said wiper blade being positioned in said groove.

5. The assembly of claim 1, further including said blade housing being constructed of a resilient material.

6. The assembly of claim 1, further including a spring coupled to an interior space in said wiper arm, said spring being configured for urging said second end of said wiper arm towards a windshield of the vehicle.

7. The assembly of claim 6, further including said supply tube extending through said spring.

8. The assembly of claim 1, further comprising:
   an inlet port coupled to said blade housing, said inlet port being in fluid communication with said channel;
   a first end of said supply tube being configured for environmental communication with a fluid reservoir of the vehicle;
   a second end of said supply tube being in environmental communication with said inlet port.

9. The assembly of claim 1, further including a reflector coupled said wiper arm.

10. The assembly of claim 1, further including a plurality of reflectors coupled to said wiper arm, said reflectors being positioned in spaced relationship along a length of said wiper arm.

11. A wiper blade assembly comprising:
    a wiper arm having a first end and a second end, said first end being configured for coupling to a vehicle;
    an elongated blade housing coupled to said second end of said wiper arm, said blade housing being constructed of a resilient material;
    a channel extending through said blade housing;
    a supply tube coupled to said wiper arm, said supply tube being fluidly coupled to said channel whereby said supply tube is configured for delivering a fluid to said channel;
    a plurality of nozzles coupled to said blade housing, each nozzle being fluidly coupled to said channel whereby each said nozzle is configured for dispensing the fluid from said channel, each said nozzle having a pair of spaced arcuate surfaces, said arcuate surfaces being convexly arcuate and facing each other;
    a wiper blade coupled to said blade housing;
    a stiffening member coupled to said blade housing, said stiffening member being positioned in said blade housing between said channel and said wiper blade;
    a groove extending into a bottom surface of said blade housing;
    a tongue of said wiper blade being positioned in said groove;
    a spring coupled to an interior space in said wiper arm, said spring being configured for urging said second end of said wiper arm towards a windshield of the vehicle, said supply tube extending through said spring;
    an inlet port coupled to said blade housing, said inlet port being in fluid communication with said channel;
    a first end of said supply tube being configured for environmental communication with a fluid reservoir of the vehicle;
    a second end of said supply tube being in environmental communication with said inlet port; and
    a plurality of reflectors coupled to said wiper arm, said reflectors being positioned in spaced relationship along a length of said wiper arm.

* * * * *